Jan. 18, 1955 W. CRAICK ET AL 2,700,138
WAVE GUIDE ROTATABLE JOINT
Filed March 14, 1950 4 Sheets-Sheet 1

Inventors:
William Craick,
Kenneth Milne,
Harry B. Taylor,
by Merton D. Morse
Their Attorney.

Inventors:
William Craick,
Kenneth Milne,
Harry B. Taylor,
by
Their Attorney.

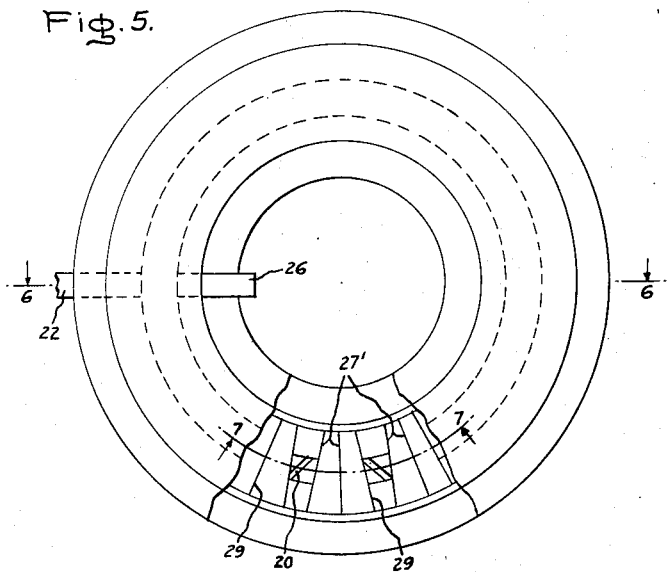
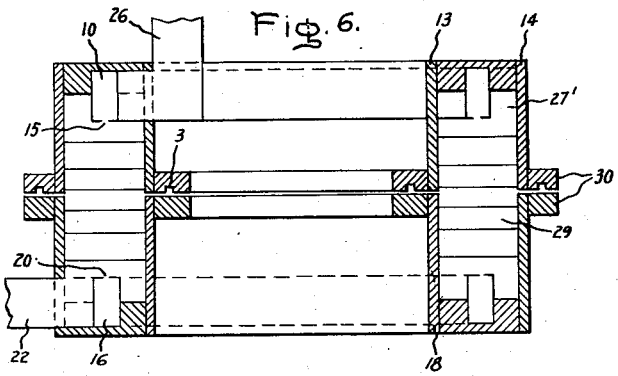
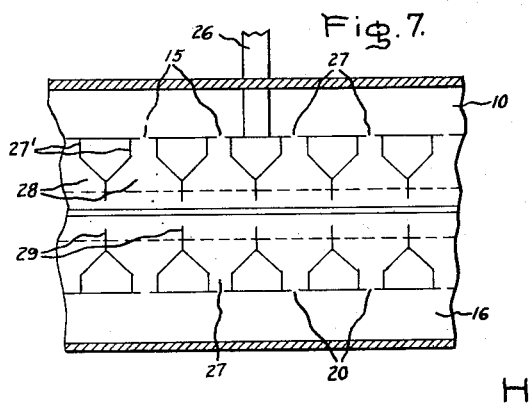
Inventors:
William Craick,
Kenneth Milne,
Harry B. Taylor,
by Merton D Moore
Their Attorney.

Jan. 18, 1955 W. CRAICK ET AL 2,700,138
WAVE GUIDE ROTATABLE JOINT
Filed March 14, 1950 4 Sheets-Sheet 4
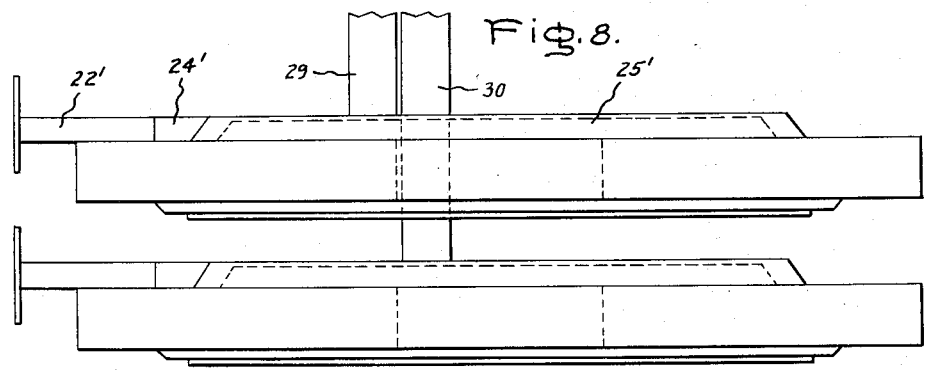
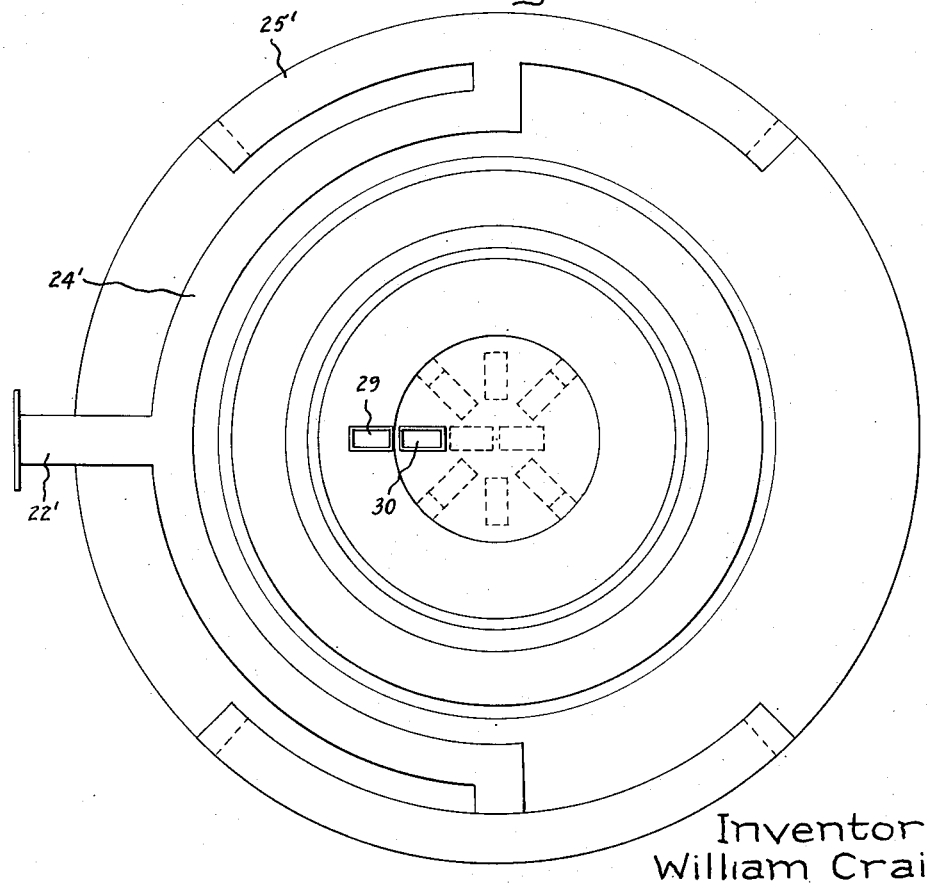
Inventors:
William Craick,
Kenneth Milne,
Harry B. Taylor,
by *Merton D Morse*
Their Attorney.

United States Patent Office 2,700,138
Patented Jan. 18, 1955

2,700,138

WAVE GUIDE ROTATABLE JOINT

William Craick and Kenneth Milne, Rugby, and Harry B. Taylor, Kelloe, Ferry Hill, England, assignors to General Electric Company, a corporation of New York Application March 14, 1950, Serial No. 149,566

9 Claims. (Cl. 333—98)

This invention relates to ultra high frequency energy radiators capable of high power handling capacity, and is particularly concerned with the transmission and radiation of ultra high frequency energy by means of wave guides of the hollow pipe type.

Where energy has been transmitted through hollow pipe wave guides, the radiation of such energy has hitherto usually been effected by means of a horn terminating the wave guide along which the energy to be transmitted is conveyed. In some cases the wave guide is terminated in a barrier having a slot therein of such dimensions as to be resonant at the frequency of the energy to be radiated, the slot forming effectively a dipole for such radiation.

In accordance with the present invention radiation is effected by providing, in the wall of a wave guide of rectangular cross-section, a plurality of radiating apertures so disposed and arranged with respect to one another as to be capable of transmitting energy fed to the guide and forming a radiating source of extended area.

Means will be described whereby two wave guides having opposing walls in juxtaposed relationship and each provided with a plurality of radiating apertures are used to transmit ultra high frequency energy at high power despite relative movement between the two wave guides. These wave guides can be arranged in annular formation so that relative rotation about a common axis of the two wave guides is permissible, thus forming in effect a slip-ring for transmission of ultra high frequency power.

An object of the invention is to provide an omni-directional radiator for ultra high frequency energy.

A further object of the invention is to provide a radiator having a plurality of spaced radiating apertures so arranged that substantially uniform radiation over an extended area is obtained.

Another object of the invention is to provide means whereby ultra high frequency power can be passed between two wave guides whilst relative movement is taking place between them.

A still further object of the invention is to provide an arrangement for transmitting ultra high frequency energy between two wave guides of rectangular cross-section and of annular form co-axially located without substantial loss of energy when relative rotation takes place between the wave guides.

A still further object of the invention is to provide means for conveying ultra high frequency energy of high power from a stationary source to an aerial which is adapted for rotation whereby to cause the emitted beam of radiation to scan a predetermined space.

Another object of the invention is to provide means for conveying ultra high frequency energy of high power from a plurality of stationary sources to a plurality of feeds to separate or common aerial systems capable of rotation with reference to the individual sources.

An additional object of the invention is to provide improved means for effecting transference of ultra high frequency energy between juxtaposed wave guides having radiating apertures in their opposing walls through which the energy is radiated from one wave guide to the other.

For a better understanding of the invention reference will now be directed to the following description of the accompanying drawings in which:

Fig. 5 is an end view, partly in section, of a modified construction of the Fig. 3 arrangement;

Fig. 6 is a cross-section on the line 6—6 of Fig. 5;

Fig. 7 is a detail of the arrangement shown in Figs. 5 and 6;

Fig. 8 is a plan view of an arrangement of two of the embodiments shown in Figs. 3 and 4 somewhat modified and disposed co-axially with one another; and Fig. 9 is an end view of Fig. 8.

Figure 1:
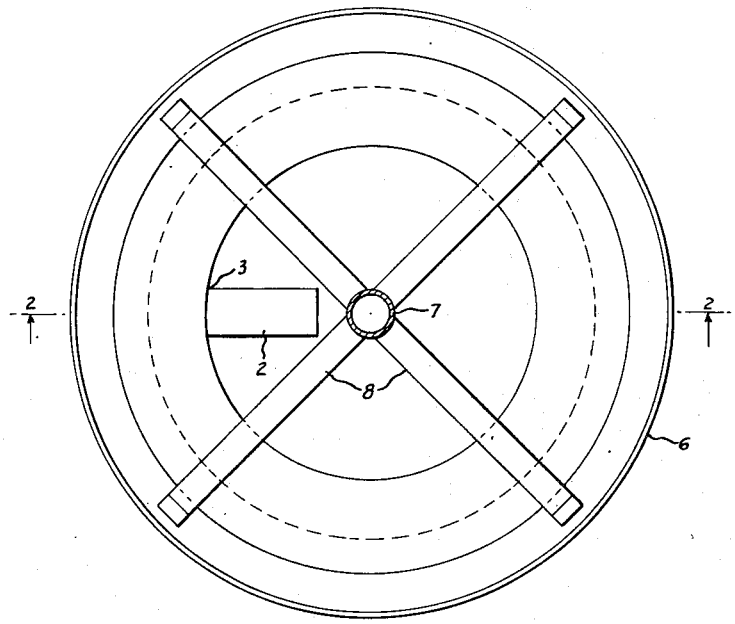
Fig. 1 is a plan view of an ultra high frequency energy radiator in accordance with the invention.
Figure 2:
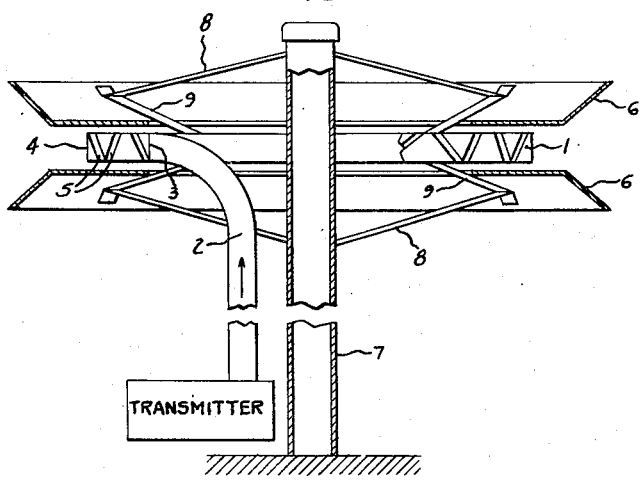
Fig. 2 is a cross-section on the line 2—2 of Fig. 1 looking in the direction of the arrows.

Referring firstly to Figs. 1 and 2, we have shown at 1 a radiator comprising a wave guide of rectangular cross-section having the normals to its adjacent walls located in vertical and horizontal planes, the wave guide being of annular form. The radiator 1 is intended to serve as an all-round looking aerial, the radiation from which takes place in a horizontal plane. For this purpose, ultra high frequency energy from a source shown in block form and labelled Transmitter is fed into the radiator through a feeding wave guide 2 which opens into the radiator 1 at its inner cylindrical wall, as indicated at 3. In another wall of the radiator 1, namely the outer cylindrical wall 4, are arranged a number of radiating apertures which may be in the form of holes of any suitable shape, probes, or other radiating couplings. One suitable arrangement of radiating apertures is shown in Fig. 2, in which the radiating apertures are in the form of resonant slots 5 tuned to the frequency of the energy supplied by the transmitter and having a length equal to $$\frac{\lambda}{2}$$

where $\lambda$ is the wavelength of the energy to be radiated, the spacing of the slots being equal also to $$\frac{\lambda}{2}$$

The right-hand portion of the wave guide 1 is, in Fig. 2, shown as continued forward from the plane of the section to indicate the radiating slots in the outer wall of the guide. The angle at which the slots are disposed with reference to the longitudinal axis of the wave guide is such that each slot radiates a power inversely proportional to the number of slots so that all the power input is radiated. These slots may be disposed all round the wall 4 of the radiator or they may be omitted from certain portions of the wall where a particular radiation pattern is desired. In order to confine the radiation to the required plane there is provided above and below the radiator 1 guiding plates 6. These are metal plates with the edges turned up to form frusto-conical portions. The radiator is shown as supported from a column 7, straps 8 connecting the plates 6 directly from the column, while straps 9 connect the wave guide 1 to the plates 6.

Figure 3:
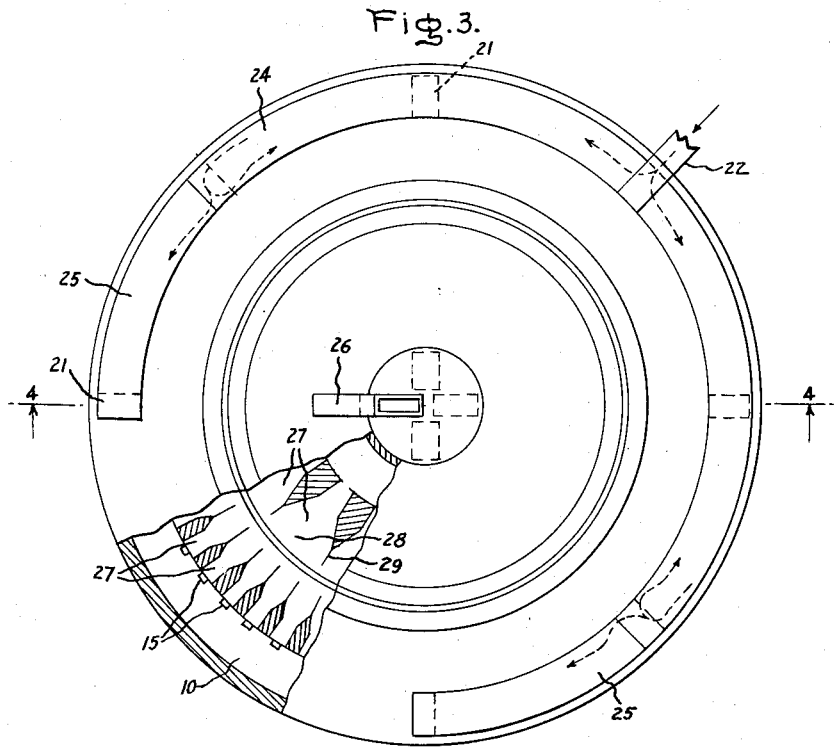
Fig. 3 is a plan view, partly in cross-section, of a constructional embodiment of the invention permitting energy to be passed between two wave guides, one of which is constructed in the manner similar to the Fig. 1 arrangement.
Figure 4:
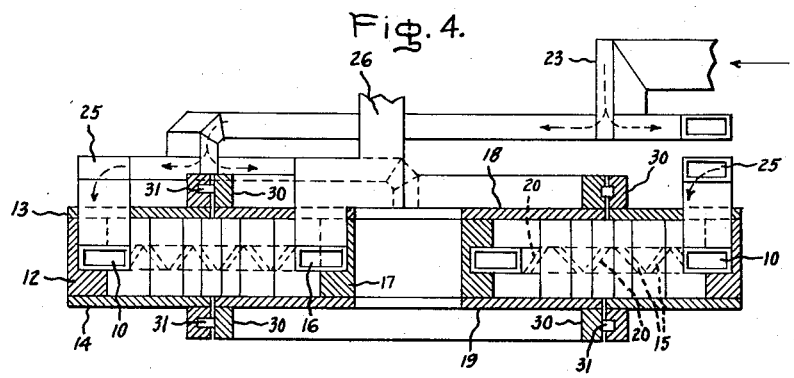
Fig. 4 is a cross-section on the line 4—4 of Fig. 3.

Referring now to Figs. 3 and 4, we have shown an arrangement in which the radiator of Figs. 1 and 2 is associated with a second radiator of similar general characteristics, to which the energy from the first radiator 1 is directed, and from which the energy is extracted. This arrangement is such that relative movement, and in particular relative rotation, between the two wave guides is rendered possible, thus producing an assembly which is capable of constituting a "slip-ring" for ultra high frequency energy.

In the arrangement shown in Figs. 3 and 4, the high frequency energy slip-ring consists of a radiator in the form of an annular wave guide 10 having a rectangular cross-section, the major dimension of the cross-section of the guide lying in a horizontal plane. The radiator is supported on a shoulder in an annular supporting ring 12 on the upper and lower faces of which are arranged side cheeks 13 and 14 respectively. The inner vertical wall of the wave guide 10 is provided with a plurality of apertures in the form of diagonally disposed resonant slots 15 uniformly spaced along the wall. Co-operating with the above-mentioned radiator is a second radiator in the form of an annular wave guide 16 supported in a similar manner to that of radiator 10 on a shoulder on an annular support 17 provided with upper and lower side cheeks 18, 19 respectively, the guide 16 being also rectangular in cross-section and positioned with its major axis in a horizontal plane which contains the plane of the major axis of the wave guide 10. The two radiators thus have two of their walls in parallel facing relation and are co-axially arranged one within the other. The outer vertical wall of the wave guide 16 is provided with apertures in the form of diagonally arranged resonant slots 20 which face towards the resonant slots 15 and are so arranged that they intersect the slots 15 at an angle of approximately 90°. The cheeks 13, 14 and 18, 19 are provided to confine the transmitted energy between the radiators.

In the arrangement shown, it is intended that the outer radiator is to be the feeding radiator, and to this end energy is fed into the outer radiator at four different positions 21 located 90° apart, by means of a branched multiple feeding system of wave guides also of rectangular cross-section. The incoming energy arrives through a wave guide section 22 making a right-angled joint with a short section 23, which section has an E-plane junction with a wave guide 24 of semi-circular shape. The wave guide section 24 terminates in two E-plane junctions at the centres of two arcuate sections 25 of wave guide which in turn terminate at their ends in vertically disposed sections which lead to E-plane junctions at the points 21 with the radiator 10. By this disposition of guides for feeding the input energy, a wide frequency band performance is obtained which is important since the greater length of the outer radiator renders it more frequency sensitive. The use of E-plane junctions in the feeding system is effective in obtaining the most uniform field distribution within the radiator.

The inner radiator 16 is shown as provided with a fed (or feeding) wave guide 26 making an E-plane junction with the radiator 16 at one point on its periphery. The wave guide 26 is the rotating wave guide which rotates with the inner portion of the slip-ring. A multiple feeding system similar to that described in connection with radiator 10 may be used if the relative functions of the radiators are to be interchanged.

In order to provide adequate diffusion of energy transmitted between the outer and inner radiators, each slot in both radiators is associated with a stub wave guide 27 constituted by vertical radially disposed plates extending between the cheeks 13, 14 and 18, 19 respectively. The narrow dimension of the stub wave guide must be small enough to suppress the mode polarised in parallel to the wide dimension. Each stub wave guide then feeds into a matched horn 28, the intersection of the two sides of adjacent horns being extended by short radial vanes 29. The construction of the stub guides and horns is more clearly shown in the cut-away portion of the plan view shown in Fig. 3. The arrangement of the stub wave guides, horns and vanes in conjunction with the transversely sloped slots on the inner and outer radiators effectively prevents modulation of the energy as a result of the relative rotation of the two radiators. It is important that the distance between the outer wall of the inner wave guide 16 and the inner wall of the outer wave guide 10, that is to say, the distance between the radiating apertures in the wave guides 10 and 16, should have an electrical length approximately equal to an odd number of quarter-wave lengths, i. e., $$\frac{n\lambda}{4}$$

where $n$ is an odd integer.

In order to prevent loss of energy at the joint between the opposing cheeks 13, 18 and 14, 19 respectively, we provide annular rings 30 in one of which is provided a quarter-wave ditch 31.

Referring now to the arrangement shown in Figs. 5, 6 and 7, the parts corresponding to those in Figs. 3 and 4 have been given the same reference numbers in order to identify them with the corresponding parts. In this arrangement, the radiators, instead of being arranged co-axially one within the other as in the previously described arrangement, are now arranged co-axially side-by-side but otherwise function in a manner similar to that already described in connection with Figs. 3 and 4. The radiators 10 and 16 are now arranged with their narrow walls (which are in parallel facing relation and in which lie the radiating slots) in spaced parallel planes, the diameters of the radiators being the same. The cheeks 13, 14 and 18, 19 for confining the radiation are now in the form of concentric cylinders. As indicated in the cut-away portion of Fig. 5 the plates 27′ forming the sides of the stub wave guides 27 are arranged parallel to one another for each aperture while the vanes 29 are radially disposed as before. Multiple feeding has not been adopted for either of the radiators 10, 16, but may be adopted if desired.

While the arrangements already described above in connection with Figs. 3 to 7 are such as to permit two or more of the slip-ring assemblies to be placed together co-axially, and for rotation to take place about the common axis, in Figs. 8 and 9 we have shown a modified construction of that shown in Figs. 3 and 4 which reduces the axial space occupied when two or more of the slip-ring assemblies are placed in co-axial relation. In this arrangement, the multiple feed above described is modified by arranging the feeding wave guides, which in Figs. 3 and 4 are in planes spaced apart axially, to lie with their longitudinal axis in a single plane; thus, only the four short feeds to the outer co-axial wave guide separate the multiple feed from this wave guide. In the drawing, the feeding wave guides, which are referenced from 12—20 in Figs. 3 and 4, are similarly referenced, but with a prime in Figs. 8 and 9 so that corresponding parts can be identified. It will be seen that the fed wave guides 29, 30 of the upper and lower assemblies 31, 32 are radially displaced so that quite a number of such fed wave guides can be accommodated in the central space, especially if both radial and angular displacement is resorted to, as indicated by the positions shown in interrupted lines in Fig. 9.

While we have disclosed several embodiments of our invention, these have been given for illustrative purposes only, and we desire it to be understood that many modifications may be made without departing from the scope of the invention as defined in the appended claims.

What we claim as new and desire to secure by Letters Patent of the United States is:

1. Apparatus for transmitting ultra high frequency energy comprising a wave guide of annular shape and rectangular cross-section having a plurality of radiating apertures formed in a wall of said guide, a second wave guide of annular shape and rectangular cross-section co-axially arranged with respect to said first-mentioned guide and having a wall thereof disposed in parallel relation to the wall of said first-mentioned guide in which the radiating apertures are located, a plurality of radiating apertures spaced in said wall of said second wave guide, a feeding wave guide joined to a wall of said first-mentioned guide other than the wall in which said radiating apertures are located, and a fed wave guide connected to a wall of said second wave guide other than that in which the radiating apertures are located, a source of ultra high frequency energy connected to said feeding wave guide at a region remote from its connection to said first-mentioned guide, and utilisation apparatus connected to said fed wave guide whereby ultra high frequency energy is adapted to be transmitted from said source to said utilisation apparatus when relative rotation takes place between said first-mentioned and second wave guides and about their common axis.

2. Apparatus for transmitting ultra high frequency energy as claimed in claim 1, in which said feeding wave guide supplies energy to said first-mentioned guide at four positions spaced 90° apart through a branched multiple feed.

3. Apparatus for transmitting ultra high frequency energy as claimed in claim 1, in which said radiating apertures are in the form of resonant slots tuned to the frequency of the energy supplied by said source to said feeding wave guide.

4. Apparatus for transmitting ultra high frequency energy comprising a wave guide of annular shape and rectangular cross-section having a plurality of spaced resonant radiating slots formed in a wall of said guide, a second wave guide of annular shape and rectangular cross-section co-axially arranged with respect to said first-mentioned guide and having a wall thereof disposed in parallel facing relation to the wall of said first-mentioned guide, in which the said resonant radiating slots are located, a plurality of spaced resonant radiating slots spaced in said wall of said second wave guide, a feeding wave guide joined to a wall of said first-mentioned guide other than the wall in which said radiating slots are located, a fed wave guide connected to a wall of said second wave guide other than that in which said resonant radiating slots are located, a source of ultra high frequency energy connected to said feeding wave guide at a region remote from its connection to said first-mentioned guide, utilisation apparatus connected to said fed wave guide, means for confining energy radiated from said resonant radiating slots in said first-mentioned wave guide so that the radiating energy excites the resonant radiating slots in the wall of said second wave guide, whereby ultra high frequency energy is adapted to be transmitted from said source to said utilisation apparatus when relative rotation takes place between said first-mentioned and second wave guides and about their common axis.

5. Apparatus for transmitting ultra high frequency energy as claimed in claim 4 having a stub wave guide of rectangular cross-section associated with each of said resonant slots, matched horns into which each of said stub wave guides lead, the horns associated with said first-mentioned and second wave guides having their mouths directed towards one another.

6. Apparatus for transmitting ultra high frequency energy as claimed in claim 5, in which adjacent horns are separated from one another by vanes which are placed at the intersection of two sides of adjacent horns.

7. Apparatus for transmitting ultra high frequency energy between a plurality of separate sources and a corresponding number of utilisation devices comprising a plurality of co-axially arranged annular wave guides each coupled to a respective one of said sources to receive ultra high frequency energy therefrom, each of said annular wave guides being provided in one of its walls with a plurality of energy radiating apertures spaced from one another, a plurality of receiving wave guides of annular form corresponding in number to that of said annular wave guides, each of said receiving wave guides being located with a wall thereof in parallel facing relation with that wall of a corresponding one of said annular wave guides in which said radiating apertures are located, said walls of said receiving wave guides being furnished with spaced apertures capable of being energised by the energy radiated by the radiating apertures in said annular wave guides, whereby to transmit energy between said corresponding wave guides, means for confining the energy transmitted between said corresponding wave guides, an energy transmitting connection between each one of the receiving wave guides and a corresponding one of said utilisation devices, and means for supporting said transmitting and receiving wave guides so as to enable relative rotation to take place between the transmitting and receiving wave guides about a common axis of all said wave guides.

8. Apparatus for transmitting ultra high frequency energy comprising a wave guide of annular shape and generally rectangular cross-section having a plurality of radiating apertures located in a wall of said wave guide, a second wave guide of annular shape and generally rectangular cross-section coaxially arranged with respect to said first-mentioned wave guide and having a wall thereof disposed in parallel relationship to the wall of said first-mentioned guide in which said radiating apertures are located, a plurality of radiating apertures spaced in said wall of said second wave guide whereby high frequency energy may be transmitted from one of said wave guides to the other when relative rotation takes place between said wave guides about their common axis.

9. Apparatus for transmitting ultra high frequency energy comprising a wave guide of annular shape and generally rectangular cross-section having a plurality of radiating apertures located in a wall of said guide, a second wave guide of annular shape and generally rectangular cross-section coaxially arranged with respect to said first-mentioned wave guide and having a wall thereof disposed in parallel relationship to the wall of said first-mentioned guide in which said radiating apertures are located, a plurality of radiating apertures spaced in said wall of said second wave guide, energy confining structures arranged along the path of energy transfer from the aperture of one of said wave guides to the other of said wave guides whereby high frequency energy may be transmitted from one of said wave guides to the other of said wave guides without loss when relative rotation takes place between said wave guides.

References Cited in the file of this patent

UNITED STATES PATENTS

| Number | Name | Date |
|---|---|---|
| 2,407,318 | Mieher | Sept. 10, 1946 |
| 2,414,266 | Lindenblad | Jan. 14, 1947 |
| 2,416,698 | King | Mar. 4, 1947 |
| 2,442,951 | Iams | June 8, 1948 |
| 2,445,896 | Tyrrell | July 27, 1948 |
| 2,471,021 | Bradley | May 24, 1949 |
| 2,482,162 | Feldman | Sept. 20, 1949 |
| 2,508,085 | Alford | May 16, 1950 |
| 2,523,455 | Stewart | Sept. 26, 1950 |
| 2,527,222 | Iams | Oct. 24, 1950 |
| 2,562,332 | Riblet | July 31, 1951 |
| 2,573,746 | Watson | Nov. 6, 1951 |